April 6, 1954   J. CALLING   2,674,101
REFRIGERATION CONTROL MEANS
Filed Sept. 8, 1950   2 Sheets-Sheet 1

Inventor:
John Calling
Paul O. Pippel
Atty.

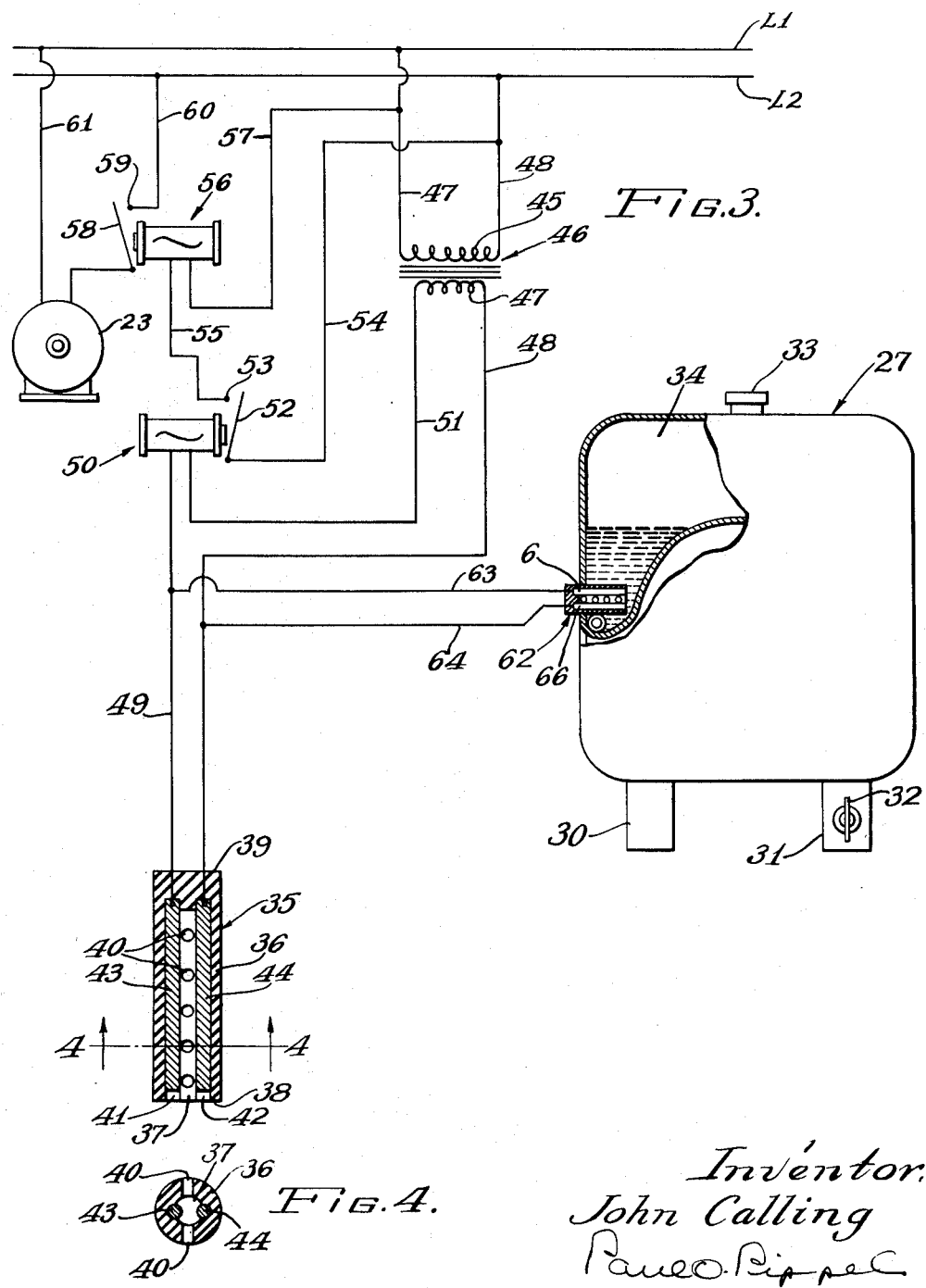

Patented Apr. 6, 1954

2,674,101

UNITED STATES PATENT OFFICE 2,674,101

REFRIGERATION CONTROL MEANS

John Calling, Evansville, Ind., assignor to International Harvester Company, a corporation of New Jersey Application September 8, 1950, Serial No. 183,782

5 Claims. (Cl. 62—4)

This invention relates to refrigeration control means and more particularly to a device for controlling or regulating the operation of an electric motor which drives a cooling mechanism.

The invention is particularly adapted for use in a refrigeration system for cooling milk. At the present time it is common practice to cool cans of milk by placing them in a cooler in contact with cooled water. This water is cooled by an evaporator coil which is immersed under the surface of the water. This type of cooling is commonly used on farms where cans of milk are generally placed in the cooler twice a day and are cooled down to a temperature of 50° F. or lower in approximately one hour. In order that a relatively small refrigeration system may be utilized, an ice bank is frozen around the evaporator coil during the hours when the cooler is not being used to cool cans of milk. It is desirable to provide some means of controlling the operation of the refrigeration system in order to freeze an ice bank of a desired size. The present invention provides a control means which will automatically regulate the operation of the refrigeration system in response to the thickness of the ice bank.

A pump is commonly used to agitate the water in order to increase the rate of heat transfer between the warm milk and cold water. An example of such a pump is found in the patent to Borgerd et al. 2,124,181, July 19, 1938, which shows a water sealed rotary type pump driven directly off the compressor motor. To properly cool the milk, the water should be agitated constantly during the initial cooling of the milk to 50° F. The present invention provides a control means which will regulate the compressor motor so that it will run continuously during the initial cooling of the milk.

The principal object of the present invention is to provide an improved and simplified control means for the purposes set forth above.

Another object of the invention is to provide a control means which is automatic in operation and is accurately responsive to the size of an ice bank within a milk cooler.

A further object of the invention is to provide an electrical circuit with a circuit breaker having two electrodes spaced apart with an electrical conducting liquid therebetween. A current will be conducted between the electrodes through the water unless the water is frozen or drained away.

A still further object is to provide a milk cooler with an electrical circuit to the compressor motor which contains a first circuit breaker which is responsive to the size of the ice bank and a second circuit breaker which is responsive to the amount of liquid in the pump housing.

These and other objects are effected by the invention as will be apparent from the following description, reference being had to the accompanying drawings, wherein a preferred form of the present invention is clearly shown.

In the drawings:

Fig. 3 is a view of the control system of this invention, partly in section and partly schematic, showing its application for controlling a motor.

Fig. 4 is a sectional view on the line 4—4 of Fig. 3.

Figure 1:
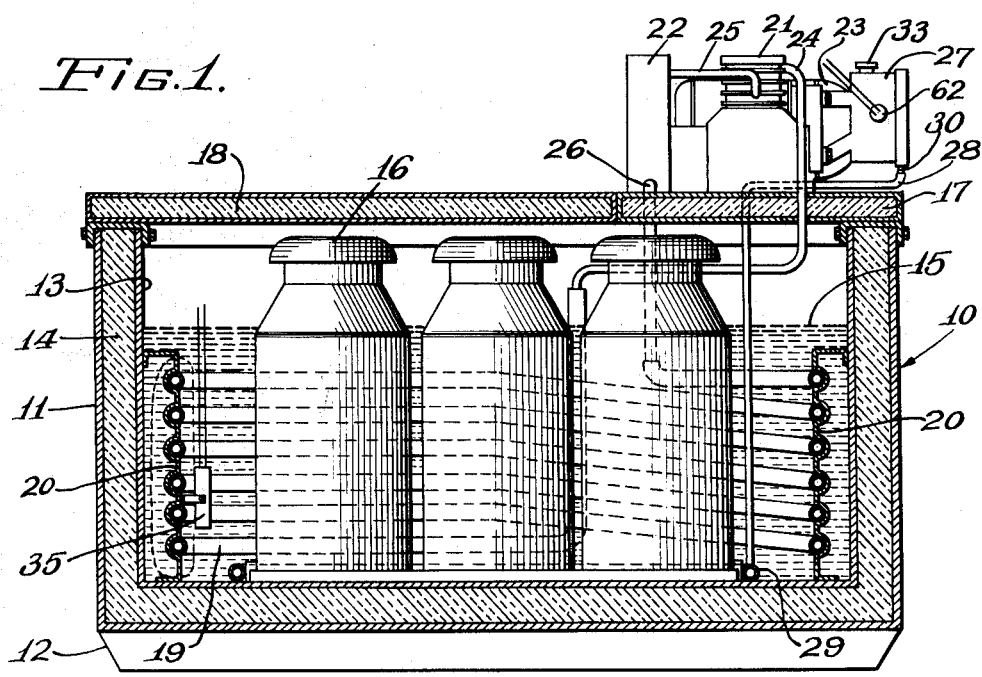
Fig. 1 is a sectional view of a refrigerator cabinet taken on line 1—1 of Fig. 2.
Figure 2:
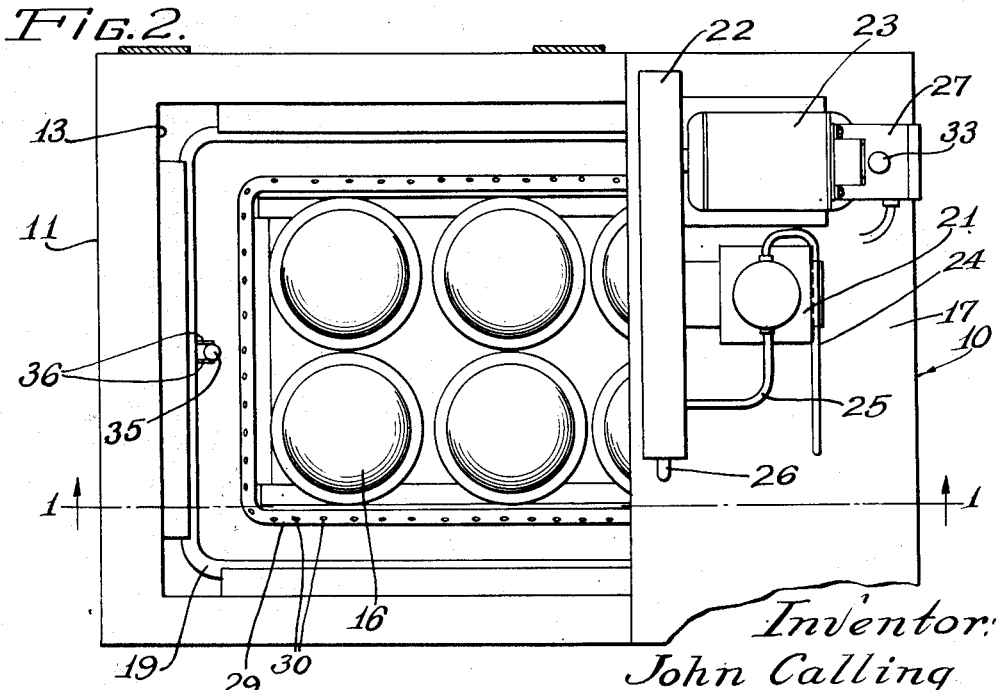
Fig. 2 is a top elevational view of a refrigerator cabinet, with the door removed, which embodies the present invention.

Referring to the drawings, a milk cooler is designated generally by reference figure 10. An outer shell 11 forms a decorative outer casing for the milk cooler which is secured upon skid bars 12. An inner liner 13 is secured within outer shell 11 in spaced relationship thereto and an insulating material 14 is positioned therebetween. The inner liner, being water-tight, is partially filled with water 15 and is of the proper size to house several milk cans 16. A top structure 17 is permanently secured to the outer shell 11 and a door 18 is hingedly connected to outer shell 11 in order to provide access to the interior of inner liner 13.

An evaporator coil 19 is fashioned with several turns which are positioned within inner liner 13 under the surface of water 15. Vertical brackets 20 support the coil in spaced relationship to the sides of inner liner 13. A compressor 21, condenser 22 and electric motor 23 are mounted upon top structure 17. The compressor is driven by the electric motor 23 through a belt drive, not shown. The compressor 21 pulls refrigerant vapors from evaporator coil 19 through conduit 24, compresses them, and then forwards them through conduit 25 to condenser 22. The refrigerant vapors are condensed in passing through condenser 22 and then flow through conduit 26 to the evaporator coil 19.

As the refrigerant flows through the evaporator coil 19, it absorbs heat from the water 15 and causes ice to freeze onto the coil 19 until an ice bank of substantial size is formed completely around the inner liner 13. This operation occurs during periods when there is no milk being cooled. When cans of milk are inserted to be cooled, they should be initially cooled to around 50° F. in approximately one hour in order to improve the keeping quality and flavor of the milk. In order to increase the rate of heat transfer between the warm milk and cold water, an air pump 27 forces air through conduit 28 to pipe 29 which extends around the bottom of the inner liner 13. The pipe 29 is provided with holes 30 adjacent the coil 19 through which the air is expelled upwardly along the surface of said ice bank. The air is of sufficient force to agitate the water 15 and cause it to circulate around the cans. The ice bank is melted and the milk is cooled to the desired temperature in approximately one hour.

For the purposes of the present disclosure, reference is had to the patent to Borgerd et al. 2,124,181, July 19, 1938, for a detailed illustration of the parts of the air pump 27. This pump is secured to one end of motor 23 and is driven by the motor. The air outlet conduit 30 of the air pump is connected to pipe 29 by conduit 28. The air inlet conduit 31 is provided with a cock 32. A filling opening 33 provides means for filling the liquid chamber 34 with liquid to the desired level. The impeller of pump 27 is driven by the motor whenever the motor is in operation but does not pump any air until the chamber 34 is filled with liquid as explained in the previously mentioned Borgerd patent.

When milk cans are placed in the cabinet, the cock 32 is closed and chamber 34 is filled with water through filler opening 33 which forms a liquid seal in the pump. The cock 32 is then opened and pump action immediately begins. Air is drawn in through conduit 31 and is discharged through conduit 30 into the pipe 29. A certain amount of the water in the chamber 34 passes through conduit 30 along with the air. The chamber 34 is of such a size as to contain sufficient liquid for the desired period of operation, generally about one hour. After the water is gradually depleted, the liquid seal is broken, and the impeller of the pump rotates freely without pumping any air.

Milk coolers of the type described are generally used on the farms where cans of milk are cooled twice a day. Since the initial cooling of the milk requires only about one hour, the refrigeration system will be operating to freeze an ice bank many hours of each day. If some means were not provided to control the operation of the refrigeration system, there is a possibility that the ice bank would grow too large. Therefore, a circuit breaker 35 is provided which will automatically regulate the refrigeration system in response to the thickness of the ice bank.

The circuit breaker 35 is secured adjacent the evaporator coil 19 near the bottom of the inner liner 13 by brackets 36 and is spaced inwardly from the coil. The circuit breaker comprises a cylindrical shaped holder 36 constructed from a non-electrical conducting material such as plastic. The holder is provided with a circular shaped chamber 37 which is open at the lower end 38 but closed at the top end 39. Several spaced apart holes 40 extend through opposite sides of holder 36 into chamber 37. Two circular shaped grooves 41 and 42 are spaced in parallel relationship along the sides of chamber 37 in which electrodes 43 and 44 respectively are positioned with a portion of each electrode extending into chamber 37.

Since the circuit breaker 35 is located beneath the surface of water 15, the chamber 37 will be filled with water through holes 40. Since this water is tap water, it will be a good conductor of electricity; therefore, an electrical current will flow between the electrodes 43 and 44. The primary coil 45 of step-down transformer 46 is supplied with current by leads 47 and 48 which are connected to line wires $L_1$ and $L_2$. With water between electrodes 43 and 44, a circuit will be completed through secondary coil 47, conductor 48, circuit breaker 35, conductor 49, relay 50 and conductor 51. This will energize relay 50 and switch arm 52 will move into engagement with contact 53. As this occurs, a circuit is completed through conductor 54, switch arm 52, contact 53, conductor 55, relay 56 and conductor 57. As the relay 56 is energized, switch arm 58 will move into engagement with contact 59, thus completing the circuit to the electric motor 23 through conductor 60, contact 59, switch arm 58, motor 23 and conductor 61.

With the electric motor 23 running, the evaporator coil 19 will be supplied with refrigerant and an ice bank will be frozen onto the coil. When the liquid chamber 34 of pump 27 has not been filled with water, the pump will not pump any air. The refrigeration system will continue to operate until the ice bank approaches the circuit breaker. At this point, the water in chamber 37 will freeze and the electrical resistance of the ice will be great enough to interrupt the current flowing between electrodes 43 and 44. This causes relay 50 to be de-energized and switch arm 52 to move away from contact 53. Since the circuit is broken to relay 56, switch arm 58 moves away from contact 59 and the circuit to the electric motor 23 is broken. With the electric motor 23 stopped, the refrigerant system will not operate. As the water 15 absorbs heat, the ice bank will begin to melt and the ice in chamber 37 will be melted. The circuit to the electric motor is then completed again and the refrigeration system will begin to operate. In this way, the refrigeration system will cycle in order to maintain an ice bank of a desired thickness. The thickness of the ice bank may be controlled by positioning the circuit breaker 35 the desired distance from the evaporator coil 19.

When cans of milk to be cooled are immersed in the water 15, liquid chamber 34 of air pump 27 is filled with water and air is forced through pipe 29. In order to insure that the air pump will run continuously during the initial cooling of the milk, a second circuit breaker 62 is positioned in the lower portion of liquid chamber 34 which controls the operation of electric motor 23. The structure of this circuit breaker is identical to that of circuit breaker 35 as described above. Conductors 63 and 64 connect circuit breaker 62 in parallel with circuit breaker 35. As long as the electrodes 65 and 66 of circuit breaker 62 are immersed in water, relays 50 and 56 will be energized and the electric motor 23 will operate, regardless of the size of the ice bank. This is an important feature when only a partial load of milk cans is inserted in the milk cooler. If the operation of the electric motor 23 were controlled entirely by circuit breaker 35, the ice bank might melt only slightly and the motor would cycle. It has been found that for proper cooling of the milk, the air pump should operate continuously during the initial cooling of the milk. Since it requires approximately one hour for the chamber 34 to be emptied of water, the circuit breaker 62 will maintain a closed circuit and the motor 23 will operate continuously during this period. Pump 27 will force air through pipe 29, and the water will circulate around the milk cans and properly cool the milk. As the water in chamber 34 drains out, the water between electrodes 65 and 66 also drains out and the space between the electrodes will be filled with air. Since the air offers a high electrical resistance, no current will flow between the electrodes 65 and 66 and the circuit to the motor 23 will be broken. Circuit breaker 35 will now control the operation of the motor in response to the size of the ice bank in the manner explained above.

From the above it is seen that a novel control means for use with a refrigeration system is provided which is immediately responsive to the attaining by the ice bank of its proper dimension, thus eliminating the possibility that the ice bank will exceed its desired thickness. The control means is simple and inexpensive to manufacture and may easily be installed in a milk cooler cabinet. It allows the operation of the motor 23 independently of the size of the ice bank during the initial cooling of the milk in order to insure that the pump 27 will pump air over the ice-bank.

Although only one form of the invention has been disclosed, modifications thereof will become apparent to those skilled in the art and, consequently, this invention is to be limited only by the scope of the appended claims and the prior art.

What is claimed is:

1. In a refrigerator cabinet, the combination of a compressor, an evaporator immersed in a cooling liquid, a pump for forcing air over said evaporator, an electric motor for driving said compressor and pump, an electrical circuit for supplying current to said motor, said electrical circuit provided with a first circuit breaker located in spaced relationship to said evaporator and a second circuit breaker located in said pump, said first circuit breaker operating to break the circuit when an ice bank of a predetermined size has formed on said evaporator, said second circuit breaker operating to close the circuit independently of said circuit breaker when the pump is operating to pump air.

2. A refrigeration system comprising a compressor, evaporator and condenser, a pump having a liquid chamber, said pump operating to force air over said evaporator only when a liquid is disposed in said chamber, said liquid gradually draining from said chamber during the operation of said pump, common drive means for said compressor and pump, an electrical circuit for controlling the operation of said drive means, and a circuit breaker having two spaced apart electrodes located in said liquid chamber and connected in series in said circuit, said drive means being started when said circuit is closed by said circuit breaker during the period that there is liquid in said chamber surrounding said electrodes whereby current is conveyed by the liquid from one electrode to the other, said drive means being stopped when said circuit is opened by said circuit breaker after the liquid has drained from between said electrodes.

3. A refrigeration system comprising a compressor, evaporator and condenser, said evaporator being immersed in an electrically conducting liquid, a pump having a liquid chamber, said pump operating to force air over said evaporator only when a liquid is disposed in said chamber, said liquid gradually draining from said chamber during the operation of said pump, common drive means for said compressor and pump, an electrical circuit which operates to start the drive means when closed and to stop the drive means when opened, a first circuit breaker having two spaced apart electrodes immersed in said electrically conducting liquid and connected in series in said circuit, and a second circuit breaker having two spaced apart electrodes located in said liquid chamber and connected in series in said circuit, said first circuit breaker operating to close the circuit when the liquid between the electrodes is not frozen and to open the circuit when the liquid between the electrodes is frozen which prevents current from flowing therebetween, said second circuit breaker operating to close said circuit independently of said first circuit breaker when liquid within the liquid chamber surrounds said electrodes.

4. In a refrigerator cabinet, the combination of a compressor-condenser-evaporator refrigeration system, a tank for holding an electrical conducting liquid in which said evaporator is immersed, a pump for forcing air over said evaporator, common drive means for said compressor and pump, an electric circuit which operates to start said drive means when closed and to stop said drive means when opened, a first circuit breaker comprising two spaced apart electrodes which are connected in series in said circuit and immersed in said cooling liquid in spaced relationship to said evaporator, said first circuit breaker operating to open said circuit when the surface of frozen liquid formed on said evaporator reaches said electrodes and causes the liquid between said electrodes to freeze, and a second circuit breaker positioned in said pump and connected in said circuit so that the circuit will be closed thereby independently of said first circuit breaker when the pump is operating to pump air.

5. In a refrigerator cabinet, the combination of a compressor-condenser-evaporator refrigeration system, a tank for holding a cooling liquid in which said evaporator is immersed, a pump having a liquid chamber, said pump operating to force air over said evaporator only when a liquid is disposed in said chamber, said liquid gradually draining from said chamber during the operation of said pump, common drive means for said compressor and pump, an electric circuit which operates to start said drive means when closed and to stop said drive means when opened, a first circuit breaker located in spaced relationship to said evaporator which operates to break said circuit when a predetermined portion of liquid has frozen on said evaporator, and a second circuit breaker having two spaced apart electrodes located in said liquid chamber and connected in series in said circuit, said second circuit breaker operating to close said circuit independently of said first circuit breaker when liquid within said liquid chamber surrounds said electrodes.

References Cited in the file of this patent

UNITED STATES PATENTS

| Number | Name | Date |
|---|---|---|
| 1,648,197 | Roodhouse | Nov. 8, 1927 |
| 2,411,888 | Long et al. | Dec. 3, 1946 |
| 2,506,775 | Calabrese | May 9, 1950 |
| 2,558,063 | Seyffert | June 26, 1951 |
| 2,622,442 | De Boisblanc et al. | Dec. 23, 1952 |
| 2,632,308 | Engelhardt | Mar. 24, 1953 |
| 2,632,324 | Oberlin | Mar. 24, 1953 |